July 17, 1934.   F. JOHANNSEN ET AL   1,966,627
DISTILLATION APPARATUS FOR THE PRODUCTION OF ZINC
OR SIMILAR VOLATILIZABLE METALS
Filed Dec. 14, 1931   3 Sheets-Sheet 1
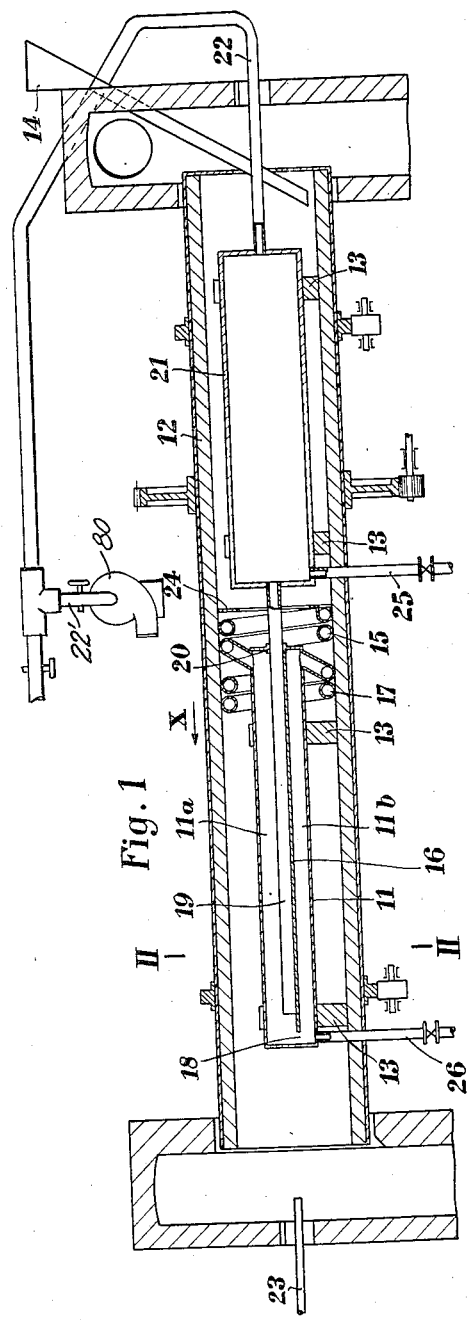
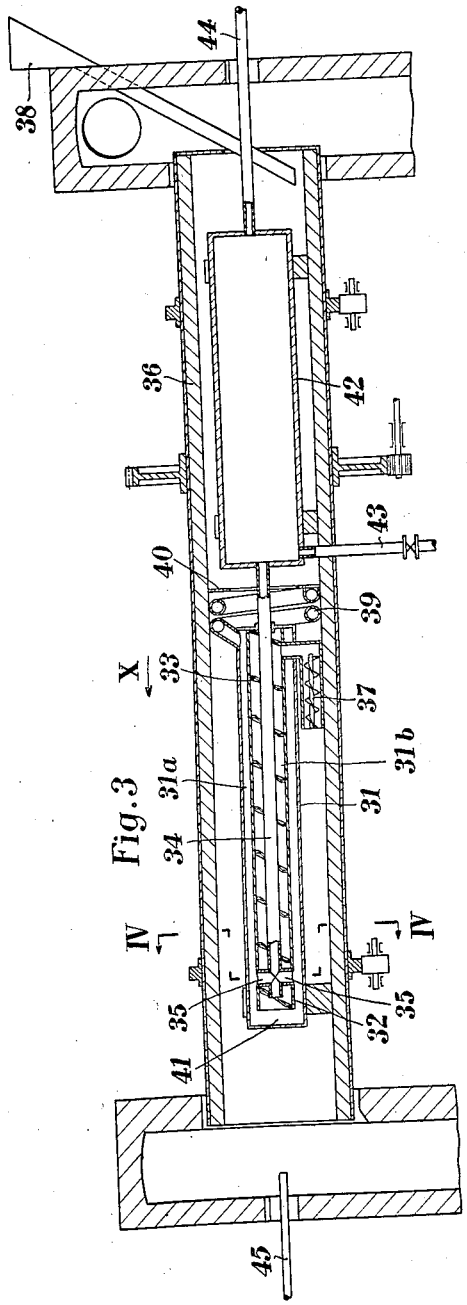

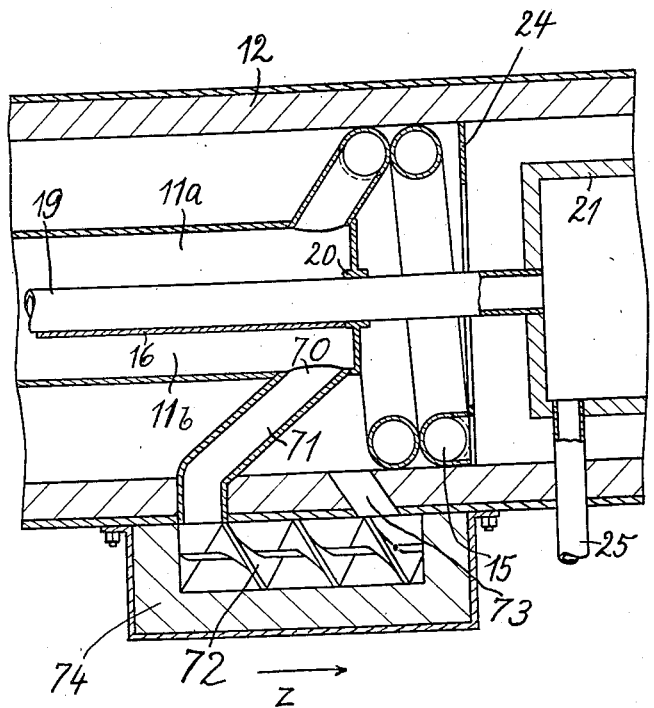

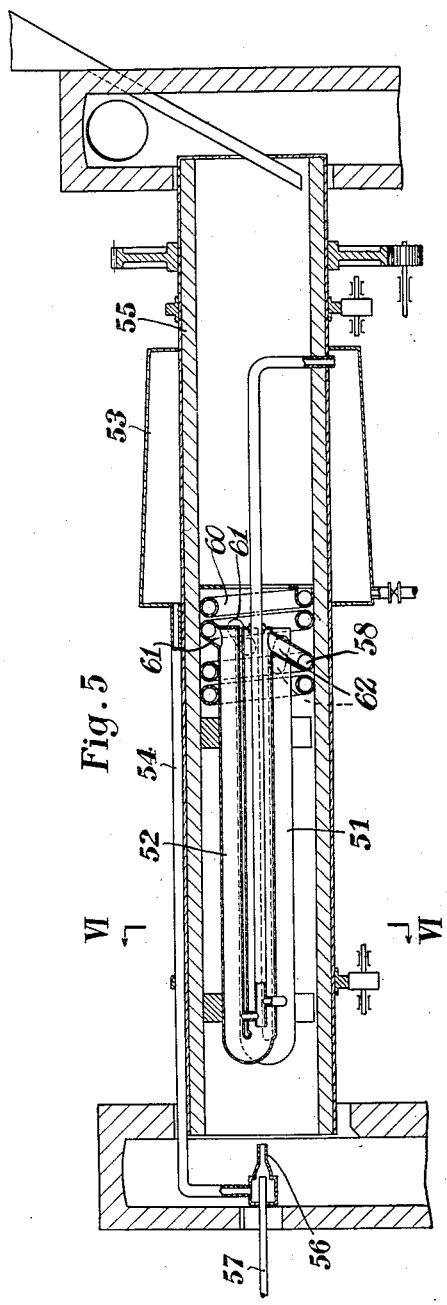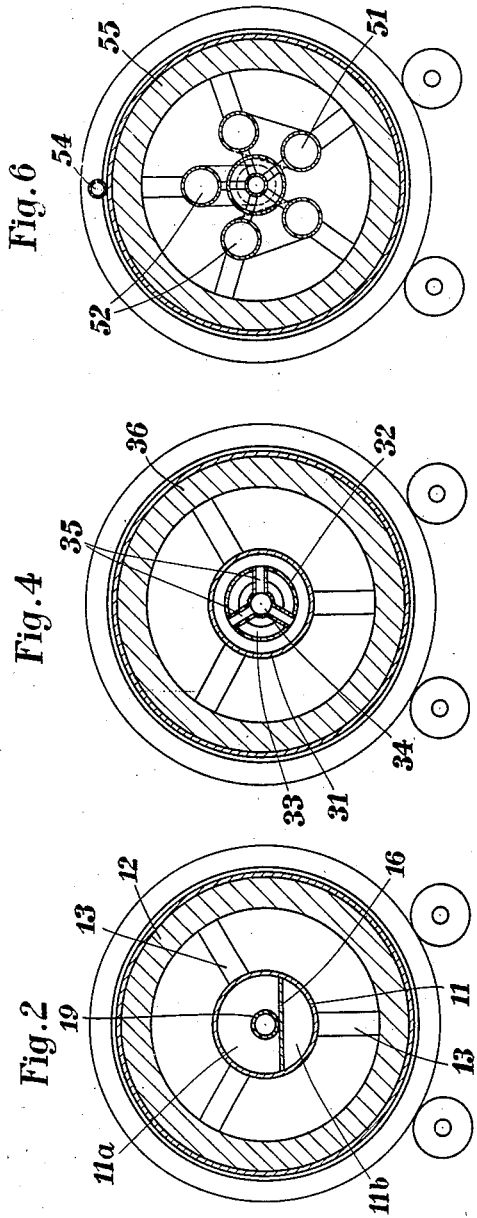

Patented July 17, 1934

1,966,627

UNITED STATES PATENT OFFICE 1,966,627

DISTILLATION APPARATUS FOR THE PRODUCTION OF ZINC OR SIMILAR VOLATILIZABLE METALS

Friedrich Johannsen and Arthur Leysner, Magdeburg, Germany, assignors to the firm Fried. Krupp Grusonwerk Aktiengesellschaft, Magdeburg-Buckau, Germany Application December 14, 1931, Serial No. 580,990
In Germany December 20, 1930

14 Claims. (Cl. 266—19)

This invention relates to apparatus for the production of zinc or similar volatilizable metals (such as cadmium, mercury etc.) recoverable by distillation from ores, metallurgical products and materials of various kinds. The object of the invention is to render the distillation process that has previously usually been employed more economical by improving the heat utilization and the yield of metal.

According to the present invention the reduction and the volatilization of the metal is effected in a muffle which is built into a rotary furnace, the residue from the muffle process being discharged into the combustion space of the rotary furnace, while excluding a flow of gas from the muffle into the furnace as far as possible and the reducing materials being burnt in said combustion space with the addition of gases containing oxygen. In this way, the heat of combustion is utilized directly for providing the necessary heat for the muffle process.

In order that the said invention may be clearly understood and readily carried into effect, the same will now be more fully described with reference to the accompanying drawings which illustrate by way of example several constructions of rotary furnace plants suitable for carrying out the process according to the present invention and in which:—

Figures 1, 3 and 5 illustrate in longitudinal section rotary furnaces with respectively different details of construction.

Figures 2, 4 and 6 are respectively cross-sections on a larger scale on the lines II—II, IV—IV and VI—VI, of Figures 1, 3 and 5, and Fig. 1b is a fragmentary sectional view of a modified form of the furnace shown in Fig. 1.

In the plant illustrated in Figures 1 and 2, a muffle 11 made of strong and particularly heat-resistant material, such for example as a special iron alloy, silicon carbide, graphite, etc. is built into the rotary furnace 12, which rotates round its somewhat inclined axis, in such manner that it is compelled to rotate with the rotary furnace. The muffle can, for example, be secured by masonry pillars 13 arranged starwise. The pipe 14 serves for the delivery of the material or of the mixed charge, in place of which, however, any other delivery device, as for example shaking troughs or the like, may be used. The charge passes from the rotary furnace space through a helical tube 15 into the muffle 11. The inner space of the muffle is divided into two compartments 11a and 11b by a partition 16. From the compartment 11b the residue from the muffle process is carried by a helical tube 17 from the interior of the muffle into the rotary furnace space. The two compartments 11a and 11b are connected together only by a gap 18 which permits passage of the material from the space 11a into the space 11b. A pipe conduit 19, which is connected gas-tight at 20 with the muffle and is provided inside the muffle with one or more apertures to receive the gases, serves to carry away the metal vapours and reducing gases developed in the muffle. The pipe conduit 19 leads to a condenser 21 which is arranged in the furnace itself and is positively connected therewith. From the condenser 21 a pipe 22 leads out of the furnace and serves to carry away the reducing gases and the uncondensed metal vapours.

The axis of the furnace 12 need not be inclined but may be arranged horizontally. Outside the furnace there can be arranged in known manner a chamber for the separation of the zinc dust. Furthermore, by means of any suitable draft device, such as a fan 80 connected by a pipe 22' to pipe 22, a slight reduced pressure can be maintained in the condenser and in the muffle. The reducing gases and vapours passing out of the furnace through the pipe 22 can be used for the heating of the muffle by being introduced, if necessary together with a heating flame, into the rotary furnace at 23. A baffle ring 24 is arranged in the furnace in front of the helical pipe 15 passing from the rotary furnace space into the muffle.

In the construction according to Figures 3 and 4, the muffle 31 is divided into two parts 31a and 31b by an inner tube 32, on the inner circumference of which a helix 33 is provided, which assists the return of the material coming from the compartment 31a, inside of compartment 31b. The outlet pipe 34 for the metal vapours is connected with the muffle part 31a by one or more connecting pipes 35. In this construction it is advisable to move the material in the outer muffle in the opposite direction to the heating gases sweeping through the rotary furnace space and to carry it back in the inner muffle in the direction of the current of the heating gases, so that the heating of the outer muffle space, which then represents the main reduction zone, takes place from the outside by the gases, and internally by the material carried back into the part 31b. In these circumstances it may be preferable to make the outer muffle pipe 31, which is exposed to the higher temperature, entirely or partially of a specially heat-resisting material, as for example silicon carbide, while for the inner muffle pipe 32 a simple iron alloy, for example, may suffice. For conveying the material between the muffle 31 and the space of the rotary furnace 36 a worm 37 is provided. For the delivery of the material the pipe 38 is provided.

39 is a helical tube and 40 a baffle ring, these parts being similar to the corresponding parts 17 and 24 of Fig. 1. If necessary, in order to remove the worm conveyor from the influence of the furnace gases, it may be protected by masonry or arranged outside the furnace, as shown in Fig. 16. In this case a pipe 71 leads from an opening 70 in the muffle to the externally situated worm 72, by which it is moved in the direction of the arrow Z and then from the worm back into the rotary furnace space through an opening 73. The latter arrangement has the advantage that the worm is accessible during working. The worm can be covered with a special brickwork 74 to prevent the material from cooling off.

The method of operation of the process with the apparatus according to Figures 1 to 4, takes place as follows:—

By means of a charging apparatus 14 or 38, the mixture of the metalliferous material, consisting for example of zinc oxide or roasted blend, together with a reduction medium, for example coke, spongy iron, iron turnings, and the like, is introduced into the rotary furnace and travels along the floor thereof up to the baffle ring 24 or 40, owing to the movement of the furnace and the slope of the material as it piles up at the feeding-in end of the furnace. Through an opening of this baffle ring the charge reaches the delivery device, the helical pipe 15 or 39. During its passage through the rotary furnace space just mentioned, the mixture is pre-heated by the furnace gases that are withdrawn. Furthermore, the furnace gases still contain as a rule in this part of the furnace a little oxygen, so that the pre-heating takes place partly by direct combustion of a part of the added reduction material. If in many cases such a combustion is to be avoided, as for example when using iron as the reduction medium, a pre-heating of the mixture can also be effected indirectly by means of the furnace gases by, for example, extending up to the inlet end of the furnace the apparatus, i. e. the helical pipe 15 or 39, which delivers the material into the muffle. In this case the material does not come into direct contact with the exhaust gases. The material delivered through the helical pipe 15 or 39 into the muffle space 11a or 31a travels therein in the direction of the arrow x, and passes through the gap 18 or 41 into the other muffle space 11b or 31b. In this space it travels back close up to its point of entry, and the residue then passes through the discharge device, i. e. the helical pipe 17 or 37, into the rotary furnace space. In the rotary furnace space, the residue then passes along the floor up to the discharge end of the furnace. As an oxygen-containing atmosphere is maintained in the rotary furnace space, there takes place combustion of the reducing materials, in particular of the coke, that are still present in the residue, so that a large part of the heat necessary for the muffle process is produced from the residue itself directly at the spot where the heat is used. The above-mentioned subdivision of the muffle assists this heat utilization or renders it more complete, since the solid material in the muffle and the residue thereof travel three times through the muffle zone, namely, in the direction x in the part 11a or 31a, then almost the whole distance in the opposite direction in the part 11b or 31b, and finally again in the direction x in the rotary furnace outside the muffle.

In the main reduction zone in the compartment 11a or 31a of the muffler, heat is therefore given up from the rotary furnace space surrounding the muffle by the combustion of the reducing materials still contained in the residue, and furthermore also from the part 11b or 31b in which a reduction on a smaller scale still takes place. With very easily distillable substances such for example as those containing the product commercially known as "Blue Powder" or "Zinc Dust", or mercury and cadmium-containing materials, one passage through the muffle will often suffice, the muffle residue being carried into the furnace space at the end of the muffle adjacent to the discharge part of the furnace. The combustion of the reducing material contained in the residue then takes place in the rotary furnace zone between this end of the muffle and the discharge end of the furnace. The temperature attained in the muffle is correspondingly lower in this form of construction. The inlet and outlet devices 15 and 17, or 39 and 37 ensure a thorough gas tight seal between the muffle and rotary furnace space. The transfer of the metal vapours from the muffle into the furnace space at the discharge device of the muffle can be prevented or reduced by maintaining a slight reduced pressure in the muffle space by means of the suction pipe. The metal vapours produced in the muffle pass through the open end of the pipe 19 or 34 into this latter, and if necessary also through intermediate openings in the pipe 19, and, in the apparatus according to Figure 3, through pipe connectors 35. The metal vapours then flow into the condenser 21 or 42 through the pipe 19 or 34 and the metal is there precipitated as a liquid bath. The precipitated metal can be drawn off continuously or intermittently by a pipe 25 or 43. This pipe 25 or 43 is fitted, in the examples of construction shown, in the vicinity of the condenser end opposite the muffle; it can, however, be fitted at some other point of the condenser as, for example, at the front end of the condenser turned towards the inlet end of the furnace. The residual gases from the condensation leave the condenser by the pipe 22 or 44.

The apparatus according to Figures 5 and 6 differs from the apparatus according to Figures 1 to 4, by the fact that, instead of a muffle being divided up internally, several muffles 51, 52 are connected in parallel, and preferably as straight tubes parallel to the axis of the furnace 55. Each of the these tubes 51, 52 may also be divided up internally, so that each could be used for the backward and forward passage of the charge in the muffle zone. The material is fed into the tubes 52 through a helical tube 60 from which branch pipes 61 lead to the several tubes 52. The material is discharged from the tubes 51 into the combustion space of the furnace through feeder pipes 62 and a helical pipe 58. The muffle arrangement according to Figures 5 and 6 is especially suited for large furnace installations.

The arrangement of the ring condenser 53 outside the furnace according to Figure 5 may be particularly suitable when one is dealing with metals the condensation point of which is very low. With other metals, it is preferable to arrange the condensation space in the preheating zone of the furnace, as then the uniform temperature obtaining in this zone may be utilized to maintain the condensation temperature, if necessary the condensation space being kept by an insulated layer at a somewhat lower temperature than the pre-heating zone itself. In this case, it is preferable to combine the return pipe 54 for the exhaust gases of the container 53 with the rotating part of the furnace 55, so that as the pipe 54 coming from the container rotates, a joint between the rotating pipe and a stationary pipe line is avoided. A reduced pressure is produced by the combustion air of the burner 56 acting as an injector.

It is recommended in general to make the feed of reducing material, for example of coke, so large from the outset that sufficient fuel is contained in the residue to ensure active combustion in the rotary furnace and to vaporize in the rotary furnace the metal contents still present in the residue from the muffle. Insofar as the heat thereby developed does not suffice to maintain the muffle process, a supplementary heating by coal dust, gases, oil, and the like, can be effected at 23, 45, or 57. If difficultly combustible substances, as for example iron, carbides etc., are used as the reducing agent, then in order to assist the combustion of the muffle residue and the vaporization of the remainder of the metal, further fuel can be added to the residue from the muffle on its discharge from the discharge device 17, 37, or 58 for example by blowing in coarse grained coke or coal through the burner 23, 45, or 57. While the liquid metal formed in the condenser is, as above mentioned, continuously or intermittently withdrawn, for example through an outlet 25 in the furnace wall, the metals reduced and no volatilized in the muffle, as for example lead, can also be drawn out through the outlet 26.

The following are the technical and economic advantages of the process according to the present invention as compared with muffle working as hitherto practiced:—

1. The continuous operation of the process means an important reduction of the very expensive and unhealthy labour of muffle working as carried out hitherto.

2. The continuous movement and mixing of the charge in the muffle permits reduction at lower temperatures, as the overheating of the muffle walls otherwise necessary in view of the colder muffle core is dispensed with. The movement of the mixture furthermore increases the speed of reduction, so that the vaporization per unit of time and muffle surface is considerably increased.

3. The surplus coke present in the residue is utilized directly, by combustion in the furnace space, for the muffle process. The development of this heat takes place in a longer zone with uniform temperature, so that the disadvantages of flame heating through local overheating are avoided.

4. By means of the present process, it is possible to work economically with a large excess of coke in the muffle and thus to check the formation of slag. This excess is then rendered directly useful for the process by the combustion in the rotary furnace.

5. By means of the present process, it is possible to effect the preliminary heating of the material by direct heating when the exhaust gases of this zone which are injurious for the condensation do not pass into the condensation installation but are carried away with the furnace exhaust gases so that the metal vapours already vaporized in this zone can be recovered from the exhaust gases.

6. For economic reasons, the reduction is preferably not completely carried out in the muffle, but only some 60 to 90% of the metal is reduced and vaporized within the muffle. After leaving the muffle, the rest of the metal is reduced and burnt from the residue in the rotary furnace and recovered from the exhaust gases. With the present process therefore there is obtained a final furnace residue containing considerably less metal than with the process hitherto used.

The improved process according to the present invention thus renders possible in an economical manner a continuous distillation working never successfully obtained heretofore owing to the difficulties of apparatus construction, since in the present process only a more or less large part of the metals is reduced and volatilized at lower temperatures in the muffle and the remaining metal content, by utilizing the reduction material still present in the residue, is recovered as oxide by volatilization, whilst a uniform heating of the muffle, not hitherto possible, is at the same time attained. While with the muffle working according to the usual practice heretofore in use 200–250% of fuel, calculated on the raw material, is in general necessary for the production of zinc, with the new process according to the present invention the distillation may be carried out with a total of 40–70% of fuel, or if some 10–40% of the material is recovered as oxide and again returned to the muffle process, with a total fuel consumption of 60–100%.

Having now particularly described and ascertained the nature of our said invention and in what manner the same is to be performed, we declare that what we claim is:—

1. Apparatus for recovering volatilizable metals, such as zinc, comprising a muffle, a furnace surrounding said muffle, means for continuously feeding to said muffle raw material from which the metal is to be recovered and a reducing agent, means for causing the material and reducing agent to travel continuously through said muffle, an outlet for the solid residue leading from said muffle into said furnace, said feeding means and outlet being adapted substantially to prevent a flow of gas from said muffle through them, means for bringing oxygen containing gases into contact with the solid residue discharge from said muffle whereby to burn any oxidizable substances remaining in said residue for heating said muffle exteriorly, means for leading out of said muffle vapors generated therein, and means for condensing the metallic constituent of said vapors.

2. Apparatus for recovering volatilizable metals, such as zinc, comprising a rotary furnace, a muffle within the combustion space of said furnace, means for feeding raw material and reducing material into said muffle, means for discharging the solid residue from said muffle into the combustion space of said furnace, said feeding and discharging means being adapted substantially to prevent a flow of gas through them, a condenser, and means for conveying vapors produced in said muffle into said condenser.

3. Apparatus as defined in claim 2, wherein said muffle is constructed so as to cause the material to travel the length thereof a plurality of times before reaching said discharge means.

4. Apparatus as defined in claim 2, in combination with means for conveying non-condensed gases from said condenser to the combustion space of said furnace.

5. Apparatus as defined in claim 2, wherein said condenser is located within the furnace, in combination with means for leading off non-condensed gases from said condenser separately from the rotary furnace exhaust gases.

6. Apparatus as defined in claim 2, wherein the solid residue is discharged from said muffle near one end thereof and is caused to travel along the muffle in the combustion space of the furnace.

7. Apparatus for recovering volatilizable metals, such as zinc, comprising a rotary furnace having a preheating space and a combustion space, a muffle located in said combustion space, means for charging raw material and reducing material into said preheating space, means for conveying the preheated material into said muffle, means for discharging the solid residue from said muffle into said combustion space, said conveying and discharging means being adapted substantially to prevent a flow of gas through them, a condenser, and means for conveying vapors generated in said muffle into said condenser.

8. Apparatus as described in claim 2, wherein said muffle is in the form of a tube mounted with its axis lying longitudinally in said furnace, the inner space of said tube being divided by a longitudinal partition, said partition terminating short of the end of said muffle opposite to the feeding-in end thereof to provide for the passage of material from one part of the muffle into the other.

9. Apparatus as described in claim 2, wherein said muffle is in the form of a tube mounted with its axis lying longitudinally in said furnace, the inner space of said tube being divided by a longitudinal inner tube, said inner tube terminating short of the end of said muffle opposite the feeding-in end thereof to provide for the passage of material from the outer part of said muffle into said inner tube.

10. Apparatus as described in claim 2, wherein said muffle is in the form of a plurality of tubes parallel to the axis of the furnace and interconnected in a series for the progressive travel of the material through the whole series of tubes.

11. Apparatus as described in claim 2, wherein said muffle is of tortuous tubular form.

12. Apparatus as described in claim 2, wherein said feeding and discharging means are in the form of helical conduits coaxial with the furnace axis.

13. Apparatus as described in claim 7, wherein said condenser is mounted in the preheating space of said furnace.

14. Apparatus as described in claim 7, wherein said condenser is mounted in the preheating space of said furnace, in combination with a pipe leading from said condenser out through the wall of said furnace for the discharge of the metal from said condenser.

FRIEDRICH JOHANNSEN.
ARTHUR LEYSNER.